US009216509B2

(12) United States Patent
Renkis (10) Patent No.: US 9,216,509 B2
(45) Date of Patent: Dec. 22, 2015

(54) SYSTEMS AND METHODS FOR AUTOMATED CLOUD-BASED ANALYTICS FOR SECURITY AND/OR SURVEILLANCE

(71) Applicant: Smartvue Corporation, Nashville, TN (US)

(72) Inventor: Martin A. Renkis, Nashville, TN (US)

(73) Assignee: Smartvue Corporation, Nashville, TN (US)

( * ) Notice: Subject to any disclaimer, the term of this patent is extended or adjusted under 35 U.S.C. 154(b) by 0 days.

(21) Appl. No.: 14/504,132

(22) Filed: Oct. 1, 2014

(65) Prior Publication Data

US 2015/0290808 A1      Oct. 15, 2015

Related U.S. Application Data

(63) Continuation-in-part of application No. 14/249,687, filed on Apr. 10, 2014.

(51) Int. Cl.
*G05B 19/04* (2006.01)
*B25J 9/16* (2006.01)
*H04L 29/08* (2006.01)

(52) U.S. Cl.
CPC .............. *B25J 9/1679* (2013.01); *H04L 67/10* (2013.01); *Y10S 901/01* (2013.01); *Y10S 901/47* (2013.01); *Y10S 901/50* (2013.01)

(58) Field of Classification Search
CPC ...... B25J 9/1679; H04L 67/10; Y10S 901/01; Y10S 901/47; Y10S 901/50
USPC ........................................................ 700/257
See application file for complete search history.

(56) References Cited

U.S. PATENT DOCUMENTS

| | | | |
|---|---|---|---|
| 7,379,879 B1 | 5/2008 | Sloo | |
| 8,311,983 B2 | 11/2012 | Guzik | |
| 8,532,820 B1 | 9/2013 | Sampath | |
| 8,559,914 B2 | 10/2013 | Jones | |
| 8,639,644 B1 | 1/2014 | Hickman et al. | |
| 8,718,837 B2 | 5/2014 | Wang et al. | |
| 8,751,043 B2 | 6/2014 | Guo et al. | |
| 2009/0087161 A1 | 4/2009 | Roberts et al. | |
| 2010/0274816 A1 | 10/2010 | Guzik | |
| 2011/0018998 A1 | 1/2011 | Guzik | |
| 2011/0288684 A1* | 11/2011 | Farlow | B25J 11/009 700/264 |
| 2012/0113121 A1 | 5/2012 | Luo et al. | |
| 2012/0114296 A1 | 5/2012 | Luo et al. | |
| 2012/0262576 A1 | 10/2012 | Sechrist et al. | |
| 2012/0282884 A1 | 11/2012 | Sun | |
| 2013/0039542 A1 | 2/2013 | Guzik | |
| 2013/0085625 A1 | 4/2013 | Wolfe et al. | |
| 2013/0166711 A1 | 6/2013 | Wang et al. | |
| 2013/0197718 A1 | 8/2013 | Lee et al. | |
| 2013/0290234 A1* | 10/2013 | Harris | G06N 5/022 706/46 |
| 2014/0122702 A1* | 5/2014 | Jung | H04L 43/0876 709/224 |
| 2014/0122720 A1* | 5/2014 | Jung | H04L 41/5054 709/225 |
| 2014/0123325 A1* | 5/2014 | Jung | G06F 21/6254 726/30 |

* cited by examiner

*Primary Examiner* — Ian Jen
(74) *Attorney, Agent, or Firm* — Triangle Patents, PLLC (57) ABSTRACT

Systems and methods for cloud-based social surveillance are disclosed. At least one mobile robot patrol a certain surveillance area and capture data content through various function modules. A computing device coupled with each robot collects and sends the data to a cloud-based analytics platform via network for surveillance real-time or near-real-time analysis. A cloud-based analytics platform is comprised of at least one cloud server, at least one cloud database, communication network, and user interface. Authorized users access the information related to their corresponding predetermined surveillance environment inputs and/or analytics of the inputs within the system via a user interface and/or override commands or updates generated based on the analysis.

32 Claims, 8 Drawing Sheets

SYSTEMS AND METHODS FOR AUTOMATED CLOUD-BASED ANALYTICS FOR SECURITY AND/OR SURVEILLANCE

CROSS-REFERENCES TO RELATED APPLICATIONS

This application claims priority from a co-pending US application; it is a continuation-in-part of U.S. application Ser. No. 14/249,687 filed Apr. 10, 2014, which is incorporated by reference herein in its entirety.

BACKGROUND OF THE INVENTION

1. Field of the Invention

The present invention relates to cloud-based systems and methods for automated analytics of input from mobile robots and/or mobile devices for security surveillance.

2. Description of the Prior Art

It is known in the art that mobile robots have the capability to move around in their environment and are not fixed to one physical location. Mobile robots can be found in industry, military and security environments. They also appear as consumer products, for entertainment or to perform certain tasks. Further, cloud computing is becoming a popular tool in many different technical fields. Cloud computing refers to the provision of computational resources via a computer network. Cloud computing has been referred to as "client-server computing", however, there may be distinctions between general cloud computing and client-server computing. For example, client-server computing may include a distributed application structure that partitions tasks or workloads between providers of a resource or service, and service requesters.

It is also known in the art that a robotic device may communicate with a server in a cloud to perform a variety of tasks. However, nowhere in the prior art is provided a social surveillance or security system that allows for mobile robots taking the place of security guards and fixed cameras, uploading of captured inputs, authentication of such inputs, and cloud-based analysis of the inputs in order to provide real-time or near real-time surveillance of a certain environment.

U.S. Pat. No. 8,718,837 for "Interfacing with a mobile telephone robot" by inventor Yulun Wang filed on Jan. 27, 2012, describes a telepresence robot. The telepresence robot may include a drive system, a control system, an imaging system, and a mapping module. The mapping module may access a plan view map of an area and tags associated with the area. In various embodiments, each tag may include tag coordinates and tag information, which may include a tag annotation. A tag identification system may identify tags within a predetermined rage of the current position and the control system may execute an action based on an identified tag whose tag information comprises a telepresence robot action modifier. The telepresence robot may rotate an upper portion independent from a lower portion. A remote terminal may allow an operator to control the telepresence robot using any combination of control methods, including by selecting a destination in a live video feed, by selecting a destination on a plan view map, or by using a joystick or other peripheral device.

U.S. Publication 2011/0288684 for "Mobile robot system" by inventor Tim S. Farlow filed on Feb. 22, 2011, describes a robot system. The robot system includes a mobile robot having a controller executing a control system for controlling operation of the robot, a cloud computing service in communication with the controller of the robot, and a remote computing device in communication with the cloud computing service. The remote computing device communicates with the robot through the cloud computing service.

U.S. Pat. No. 8,532,820 for "Cloud service to manage robotic devices" by inventor Satish Kumar Sampath filed on Sep. 19, 2012, describes methods and systems enabling a cloud service to manage robotic device. An example method includes receiving a task order including information that identifies configuration requirements for a robotic device to perform a task, program instructions executable by the robotic device to perform the tasks, and payment information for the task. The method may also include selecting one or more robotic devices to perform the task from among a pool of robotic devices. For instance, the selected one or more robotic devices may be leased for a period of time to perform the task. The method may further include providing the configuration requirements and the program instructions to the selected one or more robotic devices, and receiving confirmation that the task has been performed. According to the method, payment may be provided to one or more accounts registered with the selected one or more robotic devices.

U.S. Pat. No. 8,639,644 for "Shared robot knowledge base for use with cloud computing system" by inventor Ryan Hickman filed on May 4, 2012, describes shared robot knowledge bases for use with cloud computing system. In one embodiment, the cloud computing system collects data from a robot about an object the robot has encountered in its environment, and stores the received data in the shared robot knowledge base. In another embodiment, the cloud computing system sends instructions for interacting with an object to a robot, receives feedback from the robot based on its interaction with the object, and updates data in the shared robot knowledge base based on the feedback. In yet another embodiment, the cloud computing system sends instructions to a robot for executing an application based on information stored in the shared robot knowledge base. In the disclosed embodiments, information in the shared robot knowledge bases is updated based on robot experiences so that any particular robot may benefit from prior experience of other robots.

U.S. Pat. No. 8,751,043 for "Discovery and monitoring of an environment using a plurality of robots" by inventor Shang Q. Guo filed on Sep. 14, 2012, describes techniques for discovery and monitoring of an environment using a plurality of robots. A plurality of robots navigate an environment by determining a navigation buffer for each of the robots; and allowing each of the robots to navigate within the environment while maintaining a substantially minimum distance from other robots, wherein the substantially minimum distance corresponds to the navigation buffer, and wherein a size of each of the navigation buffers is reduced over time based on a percentage of the environment that remains to be navigated. The robots can also navigate an environment by obtaining a discretization of the environment to a plurality of discrete regions; and determining a next unvisited discrete region for one of the plurality of robots to explore in the exemplary environment using a breadth-first search. The plurality of discrete regions can be, for example, a plurality of real or virtual tiles.

U.S. Publication 2013/0197718 for "Apparatus and method for unmanned surveillance, and robot control device for unmanned surveillance" by inventor Chang Eun Lee filed on Jan. 30, 2012, describes apparatus and methods for unmanned surveillance. An unmanned surveillance device includes a robot control terminal configured to be loaded within a remote control robot under a surveillance environment, collect state information and surrounding circumstance information, operate the remote control robot in driving mode or surveillance mode according to a remote control command corresponding to the state information and surrounding circumstance information. Further, the unmanned surveillance device includes a remote control system configured to receive the state information and the surrounding circumstance information of the remote control robot from the robot control terminal, output the received state information and surrounding circumstance information of the remote control robot, and provide the remote control command to the robot control terminal.

Further, it is known in the prior art to use mobile devices for security surveillance, as well as to analyze image and video content for surveillance purposes. While the prior art discloses individual aspects of the present invention, very few, if any, teach the ability to authenticate and analyze captured inputs from un-registered user-devices. The present invention permits remote computers to accept captured inputs from a variety of mobile devices, authenticate metadata from the captured inputs, and analyze the inputs to provide surveillance information.

The proliferation of wireless, mobile devices having image and video functions is widespread and use of these device-functions continues to increase. Sporting events, social gatherings, dissident events, and emergency situations are typically captured on a multitude of devices operated by differing users. Nowhere in the prior art is provided social surveillance or security system that allows for uploading of these captured inputs, authentication of such inputs, and cloud-based analysis of the inputs in order to provide real-time or near real-time surveillance of a target environment. Prior art documents teach that camera and video input devices may be equipped with a time-stamp function that embeds a date and time into an image or video for later authentication. Also, it is known in the prior art to provide authentication of users and/or devices through the evaluation of uploaded content, including stenographic techniques such as digital fingerprinting and watermarking, or user-verification techniques such as login or CAPTCHA technologies and biometric scanning.

Notably, most of the prior art security surveillance systems disclose the use of fixed devices, rather than the use of mobile devices. For example, content-based analytics is widely used in CCTV settings and when verifying that digital content has been unaltered or authenticating a content's source (e.g., copyrighted music, images and videos). Additionally, similar technology has been deployed in military and law enforcement units, although these technologies typically require specialized pre-registered devices, as opposed to incorporating distributed, unknown devices.

By way of example, prior art documents disclosing aspects of mobile device surveillance include U.S. Pat. Nos. 8,559,914, 8,311,983 and 7,379,879, and U.S. Publication Nos. 2009/0087161, 2012/0282884 and 2012/0262576.

Additionally, geo-location information and contemporaneous timestamps may be embedded in a video stream together with a signature of the encoder, providing a mechanism for self-authentication of the video stream, whether it be from a mobile robot or device. A signature that is difficult to falsify (e.g., digitally signed using an identification code embedded in the hardware of the encoder) provides assurance of the trustworthiness of the geo-location information and timestamps, thereby establishing reliable time and space records for the recorded events. In general, data included in the database may be roughly classified into three categories: (i) automatically collected data; (ii) curated data; and (iii) derivative data. Automatically collected data includes, for example, such data as reading from environmental sensors and system operating parameters, which are collected as a matter of course automatically. Curated data is data collected from the examination of the collected data or from other sources and include, for example, content-based categorization of the video streams. For example, detection of a significant amount of motion at speeds typical of automobiles may suggest that the content is "traffic." Derivative data includes any data resulting from analysis of the collected data, the curated data, or any combination of such data. For example, the database may maintain a ranking of video source based on viewership or a surge in viewership over recent time period. Derivative data may be generated automatically or upon demand.

None of the prior art provides solutions for cloud-based analytics of distributed input devices for secure social surveillance as provided by the present invention. Further, none of the prior art provides solutions for cloud-based analytics of distributed input devices, including automatic and/or autonomous and/or profile or program-based or other mobile robotic input devices, for secure social surveillance as provided by the present invention.

SUMMARY OF THE INVENTION

The present invention relates to virtualized computing or cloud-based computing used for processing and analyzing captured data from at least one distributed mobile robot(s) for surveillance purpose. Further, the present invention relates to virtualized computing or cloud-computing network with distributed input devices and at least one remote server computer for automatically analyzing received video, audio and/or image inputs for providing social security and/or surveillance for a surveillance environment, surveillance event, and/or surveillance target.

One embodiment of the present invention provides a cloud-based surveillance system. The cloud-based surveillance system comprises at least one mobile robot having input capture mechanisms. A computing device is coupled with a mobile robot and at least one customized program application is installed on the computing device. The at least one mobile robot is configured to carry out certain surveillance tasks. The cloud-based surveillance system also comprises a cloud-based analytics platform, which receives inputs from the at least one mobile robot based upon its surveillance tasks. The cloud-based analytics platform comprises a cloud server which processes and analyzes captured input data from the at least one mobile robot, a cloud database where the captured input data and processed and analyzed data is stored, a network, which connects the at least one mobile robot and the analytics platform, and a user interface, through which authorized users access to all the information related to the entire surveillance system.

Another embodiment of the present invention provides a method for cloud-based surveillance by a cloud-based surveillance system. The method comprises predetermining a profile for a certain surveillance environment; configuring the at least one mobile robot dispatched in the surveillance environment; capturing data of the surveillance environment by at least one mobile robot; sending captured data to the cloud-based analytics platform; processing and analyzing input data on a cloud-based analytics platform; and generating commands and updates to the at least one mobile robot based on the analysis.

Another embodiment of the present invention provides a system or method for surveillance and cloud-based analytics that allows for uploading of captured inputs, authentication of the inputs, and analysis of the inputs to provide real-or near real-time surveillance of a surveillance environment, surveillance event, and/or surveillance target. The social surveillance invention includes a combination of several key features including input authentication, time, and automated cloud-based analytics relating to the inputs and the surveillance environment, surveillance event, and/or surveillance target. The authentication is provided with device and/or user with location wherein the input devices provide information including geographic location information and/or global positioning system (GPS) information to be embedded within images and videos and/or included in the messaging from the input devices over the network to the at least one server computer. The input devices include mobile input capture devices including but not limited to smart phones, tablet computers, mobile communications devices, portable computers, wearable computers and/or wearable input capture and communication devices.

These and other aspects of the present invention will become apparent to those skilled in the art after a reading of the following description of the preferred embodiments when considered with the drawings, as they support the claim invention.

DETAILED DESCRIPTION OF THE PRESENT INVENTION

Referring now to the drawings in general, the illustrations are for the purpose of describing at least one preferred embodiment of the invention and are not intended to limit the invention thereto.

The present invention provides virtualized surveillance analytics and data management, including cloud-based surveillance systems and methods for providing centralized and/or distributed cloud-based analytics of content including inputs captured by at least one device in a predetermined surveillance environment, wherein the device is a mobile robot, a mobile phone or some other mobile device.

Each of the at least one mobile robot has a corresponding drive system and controller system. Furthermore, each mobile robot has at a sensing system with various function modules for capturing inputs and communicating those captured inputs or content; function modules are selected from: image module, video module, sensor modules, intelligence recognition (e.g. facial/ID/speech recognition) module, control module, and/or input capture module. Each of the mobile robots is coupled with a corresponding computing device. The computing device has its own memory and processor, and at least one customized application program is installed on the computing device.

The distributed devices, whether robotic or simply mobile input capture devices, communicate with the cloud-based storage or database(s) and at least one server within the cloud-based analytics platform via a communications network. The cloud-based analytics may be stored in the cloud-based system database and accessible remotely and securely for providing security for at least one surveillance environment, surveillance event, and/or surveillance target. Related secure wired and/or wireless networks and systems, and methods for using them are disclosed in U.S. Pub. Nos. 2006/0064477 and 2014/0071289, and U.S. Pat. Nos. 7,784,080, 7,719,567, 7,954,129, 7,728,871, 7,730,534 and 8,395,664, each of which is incorporated herein by reference in its entirety.

In one embodiment of the present invention, a cloud-computing surveillance system is provided and includes: at least one server computer having a processor and a memory, constructed and configured in network-based communication with a multiplicity of remote input devices having input capture mechanisms; inputs captured by the remote input devices transmitted within a secure messaging communicated over the network; wherein the inputs are received, authenticated, and indexed by the at least one server computer and stored in a corresponding database; wherein the inputs are processed and analyzed based upon at least one profile for a surveillance environment, a surveillance event, and/or a surveillance target, for providing a near-real-time analysis of the inputs to determine a status of security. The at least one profile associated with the surveillance environment, surveillance event, and/or surveillance target may include security level (low, medium, high), alert level, time interval for review for change, authorized remote input device and/or user information, and combinations thereof. The status may be selected from: normal, questionable, alert, urgent, disaster, injury, and any descriptor or indicator of the level and condition of the environment, event, and/or target compared with predetermined conditions.

In preferred embodiments of the present invention, the cloud-based surveillance system includes at least one mobile robot constructed and configured for network-based communication with a cloud-based analytics platform. The platform includes at least one server, at least one database, a communications network, and at least one user interface for providing remote authorized users access to review the data related to predetermined surveillance environment(s) and/or to send commands and/or updates to the cloud-based surveillance system. Authorized users access the information related to their corresponding predetermined surveillance environment inputs and/or analytics of the inputs within the system via a user interface and/or override commands or updates generated based on the analysis.

In the present invention systems and methods, the at least one mobile robot used for surveillance is preferably specifically configured for each target or predetermined surveillance environment. In the case of a plurality of robots associated with one or more targets or predetermined surveillance environments, each robot has a designated surveillance sub-area to monitor, and certain monitoring tasks to carry out within the designated surveillance sub-area. The cloud server produces or generates a profile of the target or predetermined surveillance environment; preferably, the profile includes all information relevant for comprehensive coverage, i.e., complete coverage of the target or predetermined surveillance environment, including any designated sub-area(s). The surveillance profile and configuration information is stored in the cloud database of the analytics platform. In some implementations, the controller of the robot accesses the profile through the communication between the local computing service and the analytic platform. In some implementations, the profile description for the designated surveillance sub-area is stored in the local computing device and the robot controller may access it locally.

In preferred embodiments, a profile is determined, defined and/or selected for a certain surveillance environment by a cloud server based on environment descriptions and surveillance requirements. The profile of each predetermined surveillance environment includes normal features, feature statuses, and/or action levels. The normal features include authorized personnel and movements, rated sound level, illumination, temperature, humidity and air quality level, etc. The statuses are selected from: normal, questionable, alert, urgent, disaster, injury, and any descriptor or indicator of the level and condition of the environment. The action choices include immediate action, observation for certain time, alarming, time interval for review for change, and combinations thereof.

In one embodiment, the profile associated with the inputs may include user and/or owner identifier, equipment identifier, communication security level, and combinations thereof. In one embodiment, the secure messaging includes internet protocol (IP) messaging of data packet(s) including the inputs, and may further include encryption, digital fingerprinting, watermarking, media hashes, and combinations thereof. As described in the following detailed description of the invention, the inputs are selected from images, audio, and/or video; more particularly, the input is selected from live streaming video, real-time images and/or audio, previously recorded video, previously captured images and/or audio, and combinations thereof. The remote input devices include mobile phones, smart phones, tablet computers, portable computers, mobile communication devices, wearable input capture devices, and/or security cameras. By way of example and not limitation, a wearable input capture device may be removable, portable devices such as eyewear (like Google Glass), headwear, wristwear, etc.

The analysis may be performed, in whole or in part, by a virtualized or cloud-based computing system and provides for remote access of analyzed inputs, and involves at least one rules engine for transforming individual inputs into analyzed content. The analyzed content may include inputs from more than one remote input device. Additionally, the analyzed content may be generated by transforming the original inputs by the at least one server computer automatically assembling input fragments into an integrated content file, and wherein the original input is stored and associated with the integrated content file.

In one embodiment of the present invention, the authentication includes confirmation of global positioning system (GPS) location of each of the remote input devices providing inputs and matching the GPS location with corresponding at least one predetermined surveillance environment, surveillance event, and/or surveillance target. Preferably, the analysis includes authentication of the input device with a device identification, a user identification, a geographic location, and a time associated with the input and the predetermined surveillance environment, surveillance event, and/or surveillance target.

At the at least one server computer, the authenticated inputs may be automatically tagged, combined, grouped, edited, and analyzed by the cloud-based system according to the predetermined surveillance environment, surveillance event, and/or surveillance target. Also, the input is verified by authenticating the at least one robot, and/or the at least one input device and/or its corresponding user and the input is analyzed to confirm that there has been no alteration, editing, and/or modification to the input prior to its receipt by the at least one server computer.

The present invention also provides methods including the steps of: providing a cloud-based or virtualized computing system having at least one server computer with a processor and a memory, constructed and configured in network-based communication with a multiplicity of remote input devices and/or mobile robots having input capture mechanisms; receiving by the at least one server computer inputs from the remote input devices transmitted within a secure messaging communicated over the network; authenticating the inputs; indexing the inputs by the at least one server computer; and storing the inputs in a corresponding database; processing and analyzing the inputs by the at least one server computer using at least one profile for a surveillance environment, a surveillance event, and/or a surveillance target, for providing a near-real-time analysis of the inputs to determine a status of security. Additional steps may include: providing a priority for the secure messaging; analyzing inputs from more than one remote input device and/or mobile robot in near real time to provide social security surveillance of the surveillance environment, surveillance event, and/or surveillance target; and/or automatically assembling input fragments into an integrated content file, and wherein the original input is stored and associated with the integrated content file. Also, preferably, the authenticating step, when necessary, includes automatic authentication of the input device and/or its user based upon the combination of a device identification, a user identification, a geographic location, and a time associated with the input and the predetermined surveillance environment, surveillance event, and/or surveillance target.

The present invention systems and methods include a social surveillance system for providing automated cloud-based analytics that allows for uploading of captured inputs, authentication of the inputs, and analysis of the inputs to provide real-or near real-time surveillance of a surveillance environment, surveillance event, and/or surveillance target. The social surveillance invention includes a combination of several key features including input authentication, time, and automated cloud-based analytics relating to the inputs and the surveillance environment, surveillance event, and/or surveillance target. The authentication is provided with device and/or user with location wherein the input devices provide information including geographic location information and/or global positioning system (GPS) information to be embedded within images and videos and/or included in the messaging from the input devices over the network to the at least one server computer. Additionally, overlay and other techniques may also be used during upload of content, such as, by way of example and not limitation, TDOA, AIA, and RF fingerprinting technologies. Alternatively, a device may be pre-registered, as with a mobile robot, such that the security embedded in the transmitted messages may include authentication of the pre-registration and association with a device profile or account.

Preferably, the input devices are equipped with a timestamp function that embeds a date and time into an image or video for later authentication, or their messaging provides a date and time associated with the inputs, including images, and/or video. Additionally, the authentication of users and/or devices may occur through the evaluation of uploaded content, including stenographic techniques such as digital fingerprinting and watermarking, or user-verification techniques such as login or CAPTCHA technologies and biometric scanning. While some content is considered verified by authenticating a user or device, additional analytics may be performed by the cloud-based system to establish that content has not been modified from its original sources, such as through the use of media hashes. Additionally, after receiving and authenticating multiple sources of information, analytics may allow for the inputs to be aggregated, tagged, combined, edited, and/or grouped.

Although in the prior art, content-based analytics is used in CCTV settings and when verifying that digital content has been unaltered or authenticating a content's source (e.g., copyrighted music, images and videos), it has not been used for distributed, cloud-based social surveillance allowing for a multiplicity of inputs from remote input devices to at least one server computer for analysis of the inputs based upon a predetermined surveillance environment, surveillance event, and/or surveillance target, and more particularly for security surveillance.

Systems and methods of the present invention provide for a multiplicity of remote input devices, by way of example and not limitation, including commercially available devices such as Google glass or glasses or headwear having input capture mechanisms and mobile communication capability, mobile smart phones, cellular phones, tablet computers, gaming devices such as an Xbox Kinect controller, so long as the input device is constructed and configured to capture and share or transmit video and/or images associated with location data, direction, etc. and owners/users with the cloud-based surveillance system. The input information is stored on at least one server computer, in a centralized and/or virtualized central manner, and the input information is indexed, organized, stored, and available for access by authorized users via the network through a website or portal or API. The input device is preferably registered with the system through an app or software application associated with the remote or distributed input devices. While preregistration is not required for the inputs to be associated with at least one surveillance environment, surveillance event, and/or surveillance target, all inputs are required to be authenticated by the system based upon the input device, the input device user, and/or corresponding identification and/or association with the surveillance environment, surveillance event, and/or surveillance target. By way of example and not limitation, a video input is transmitted by a remote input device with an email including the video input as a media attachment within the message; the cloud-based system and its at least one server computer receives the email message, authenticates the email address associated with the device and/or user, and accepts the video. Also the same is provided with MMS or text messaging with video and/or audio and/or image.

In one embodiment of the present invention, method steps include: providing the system as described hereinabove; providing a software application operating on a remote input device for capturing at least one input including an image, a video, and/or an audio input; activating the software application; capturing the at least one input including an image, a video, and/or an audio input; automatically and/or manually including structural and/or descriptive metadata, including but not limited to unique identifying indicia associated with the input, time, location or geographic information, text and/or audio notation associated with the input, priority flag or indicator, and combinations thereof.

Optionally, the software application and/or the remote input device automatically verifies and authenticates the user of the remote input device, for example using biometric authentication such as facial recognition, fingerprint, etc., and/or using a user identification and passcode or personal identification number, or other authentication mechanisms. Preferably, the authentication information is included with the metadata corresponding to the input(s) and associated therewith as a composite input, and the software application and/or the remote input device automatically transmits the composite input over the network to the cloud-based system and the at least one server computer thereon and is saved in at least one database. In preferred embodiments of the present invention, a user interface is provided on the remote input device(s) or distributed computer device(s) and their corresponding displays to provide secure, authorized access to the composite input and/or to all inputs associated with predetermined surveillance environment, surveillance event, and/or surveillance target stored in the cloud database.

Also, preferably, the software application on the remote input device provides an automated sharing feature that provides for single click select and activation of media sharing of the selected inputs captured. In one embodiment, the single click select and activation of media sharing of the selected inputs captured on that remote input device provides for automatic association of the shared media with at least one email address corresponding to the user and the remote input device.

A surveillance route or map is predetermined when the mobile robot is configured for specific surveillance tasks in a specific surveillance sub-area. In some embodiments, there are tags along the route and/or map designated for a mobile robot. Each tag denotes a surveillance spot for a certain mobile robot. Each tag preferably has its three-dimension coordinate information, and also certain profile features for that spot or surrounding area and corresponding surveillance tasks for the robot. In the surveillance environment, there are signs or indicators along the real routes for the robots to recognize and follow within a surveillance environment.

The at least one robot used for surveillance has various core robot features, which include: a drive system (e.g. mobility); a sensing system (e.g. video, image, temperature, humidity, air quality, etc.), and a reliable, safe, secure robotic control system executed on a controller; a power supply, and/or input capture module.

A computing device is coupled (detachable or fixedly attached) with each mobile robot used for surveillance. The computing device may be a tablet computer, portable electronic device, such as phone or personal digital assistant, or a dumb tablet or display (e.g., a tablet that acts as a monitor for an atom-scale PC in the robot body). In one embodiment of the present invention, the computing device has a touch screen or other haptic-activated or taptic-activated user interface for displaying a graphic user interface (GUI) and for receiving inputs from random individuals within a surveillance environment for verification or interaction. Also preferably, other sensors or input capture devices are included, by way of example and not limitation, audio and/or video inputs, for receiving instructions, commands, and/or responses from authorized users and/or random individuals within the predetermined surveillance environment.

Preferably, the computing device is integrated with the robot and can communicate with the drive system, sensing system, and controller system of the robot internally. The computing device also provides communication capabilities (e.g., secure wireless connectivity and/or cellular communication), for communications between the robot and the analytics platform, and between different robots. In some embodiments, the computing device also provides refined application development tools, such as speech recognition, and person or object recognition capabilities.

In a preferred embodiment, the computing device executes an operating system different from the operating system of the robot controller. For example, the robot controller executes an operating system for robot control while the computing device executes a business enterprise operating system, such as Android provided by Google, Inc., iPad OS provided by Apple, Inc., and/or other smart phone operating systems.

The computing device has its own memory and processor, operable for executing one or more robot applications. In this invention, at least one software application for surveillance is customized with specific requirements stored in the memory and executable on the processor. This customized software can be updated or extended based on the needs of the surveillance for each robot. Preferably, the computing device filters, samples, prioritizes and encodes captured data content from the sensing system of the at least one robot before sending to the cloud-based analytics platform in securing messaging.

Preferably, the at least one mobile robot is equipped with a location or coordinate indicator and/or time-stamp or time indicator that embeds or securely includes or attaches location and time information to the collected data or captured inputs. In another alternative, the secure messaging provides location and time information associated with input data. Additionally, overlay or other techniques may also be used during upload of content, such as, by way of example and not limitation, TDOA, AIA, and RF fingerprinting technologies.

Before executing different functions for surveillance, the at least one robot is required to be recognized and/or registered by the analytics platform. Thus, each robot has its own identity and specific configuration. The identity information is used for recognizing and/or registering each of the robot(s) and authenticating input content communicated by each of the robot(s) at the cloud server. The robot(s) also provides time and location information which is associated with, linked with, imprinted on, and/or stored on or with the data or inputs captured by the various function modules on the robot(s) and/or the corresponding computing device for each robot. These functions include patrolling, image capturing, video streaming, video recording, audio capture, environmental conditions monitoring, facial recognition, speech recognition, person/object recognition, automated operation, and/or input capture. Environmental conditions monitoring further includes sensing and monitoring of temperature, humidity, illumination, noise level, and combinations thereof. In one embodiment, the robot(s) further include command and control modules for communication of command messages and/or control messages for modifying settings of electronic devices within the predetermined surveillance environment. By way of example and not limitation, the electronic devices are selected from the group consisting of building control systems, thermostats, lighting controls, security system controls, motion sensors, video sensors, audio sensors, environment settings sensors, and combinations thereof.

The image module captures static images for the surveillance environment. The vision module monitors the field of view of the robot within the surveillance area, including detection of movement or lack of movement within the area. Preferably, the video module records audio coupled with movement or lack or movement, video, and other inputs simultaneously and/or selectively. The robot may further be configured to detect and/or communicate changes of status (change of temperature, noise, and/or air quality, etc.) in the predetermined surveillance environment compared with target settings or profile for the environment. In one embodiment, the robots only communicate with the cloud-based analytics system to indicate changes of status, or only transmit data of changed status, rather than total captured inputs for at least some attributes within the predetermined surveillance environment.

Each robot also has one or more sensor modules to monitor the illumination, temperature, humidity, noise, air quality and etc., associated with the surveillance environment. Each robot has the knowledge of the allowed range of illumination, temperature, humidity, noise, and air quality level. Preferably, once there is any abnormality, the robot(s) can adjust corresponding devices within the surveillance environment autonomously. For example, when the sensor module detects the illumination is much higher than the allowed range, the robot has the ability to switch off some lights, for example, for the purpose of energy conservation. In another example, when the sensor module detects the temperature is higher than the allowed maximal value, the robot has the ability to turn down the air conditioner, for preservation of some temperature-sensitive objects within the environment.

Each robot also has various intelligence modules, including facial recognition module, ID recognition module, object recognition, speech module and etc. Facial recognition module enables the robot to recognize authorized individuals associated with the surveillance environment. Also the robot is RFID or NFC enabled to recognize valid ID cards. At the same time, the robot is able to initiate or respond to speeches thus interact with human beings. In one embodiment, a robot patrols within a certain environment, when there is an individual within the robot's field of view, the robot has the ability to recognize if he/she is authorized to be there. If he/she is suspicious, the robot initiates conversation and asks the person to show his ID information. When the robot cannot determine the authorization of the person, it has the ability to send an immediate signal to the platform and remote authorized users can get the signal immediately via user interface and take actions (e.g. give permit/warning to the individual, etc.)

The sensing system collects data through vision (e.g. via a camera), map imaging (e.g. via a 2D or 3D imaging device), environmental monitoring (illumination, temperature, humidity, noise, air quality, etc.), and intelligence recognition. The sensing system may also provide collision detection, obstacle detection and obstacle avoidance and etc.

The control system can provide heading and speed control, body pose control, navigation, and core robot applications. The drive system carries out the movement controlled by the controller system and assisted by certain sensing functions. Each robot is able to tour or patrol a certain area on its own following a predetermined route or map.

The computing device is the "brain" of the robot and one of the important parts of the invention. The captured raw data from various function modules on a mobile robot are encoded by a customized application program and then sent to the cloud database via communication network. Preferably, the raw data is filtered, sampled, prioritized and encoded into an IP-based secure message. The IP messaging of data packet(s) includes input data, and may further include encryption digital fingerprinting, watermarking, media hashes, and combination thereof.

The computing device communicates with the platform and send the raw data and the secure message to the cloud database. The computing device also has the ability to communicate with other computing devices on other robots for exchanging information. In some embodiments, the robot stores the raw data and the secure message content at its local memory as well. Meanwhile, the customized application program also carries out local data analysis and make local decisions to certain situations.

Another important part of one embodiment of the surveillance system is a cloud-based analytics platform. It involves at least one cloud server, at least one cloud database, communication network and user interface.

The at least one server has access to the associated cloud database. The input content from the at least one mobile robot is decoded in the at least one server. There is at least one rules engine for processing the input content. Such process includes authenticating, indexing, aggregating, tagging, combining, grouping, editing, and etc. Additionally, the processed content is generated by transforming the original inputs by the at least one server and automatically assembling input fragments into an integrated content file. Both the original input content and the associated integrated content file are stored in the database.

In one embodiment of the present invention, the authentication includes confirmation of the mobile robot, whose ID is in the authorized list configured for the specific surveillance environment, and confirmation of location and time information printed on the input content of each of the mobile robot matching the location and time information for specific surveillance environment for each robot. Preferably, the authentication of the input content involves the robot identification, its geographic location, and time associated with the input content for the specific surveillance environment. In some embodiments, the authentication of input content can be done through evaluation of uploaded content, by stenographic techniques such as digital fingerprinting and watermarking, or user-verification techniques such as login or CAPTCHA technologies and biometric scanning Thus, the input content is verified that there has been no alteration, editing, and/or modification to the input prior to its receipt by the at least one server.

Then the processed content is analyzed for security surveillance purpose. In some embodiments, the at least one server generates commands or updates to the mobile robots based on the analysis. Additionally, the historic data stored in the database for a certain surveillance environment may also be analyzed for other purposes. For example, if the surveillance system is installed in a shopping center, data collected throughout the year can be used for market trend analysis and product development. The processing and analyzing in the at least one server is real-time or near real-time.

The at least one cloud database stores input content from mobile robots and is accessible to the cloud server for analyzing and processing the input content, the processed data associated with the original data is also stored in the database as well. Before receiving input content from mobile robots in a certain surveillance environment, the predetermined surveillance profile is stored in the database as well.

In general, data included in the database may be roughly classified into three categories: (i) automatically collected data; (ii) curated data; and (iii) derivative data. Automatically collected data includes, for example, such data as reading from environmental sensors and system operating parameters, which are collected as a matter of course automatically. Curated data are data that are collected from examination of the automatically collected data or from other sources and include, for example, content-based categorization of the video streams. For example, detection of a significant amount of motion at speeds typical of automobiles may suggest that the content is "traffic." Derivative data includes any data resulting from analysis of the automatically collected data, the curated data, or any combination of such data. For example, the database may maintain a ranking of video source based on viewership or a surge in viewership over recent time period. Derivative data may be generated automatically or upon demand.

The communication network allows automatic data exchange between the at least one robot and the cloud-based analytic platform, and the communication within the analytic platform is also realized by communication network. The communication network may be wired networks, direct-wired connections or wirelessly such as acoustic, RF or infrared through a wireless communication antenna in communication with the network's wireless communication antenna and the network interface unit, which may include digital signal processing circuity when necessary. The network interface unit may provide for communications under various modes or protocols. For example, the secure messaging send from mobile robots to the platform may be internet protocol (IP) messaging of data packet(s). The communication between robots and the cloud-based servers and storages are two-way real-time or near real-time.

This cloud-based surveillance system automatically monitors a certain area and reacts to certain situations. Authorized users may log in and check the surveillance information via user interface. The user interface may be accessed by a smart phone, a tablet, or a PC. It may be a web browser, or an application program ("App") installed on the smart phone or tablet. The authorized user(s) can access to the entire surveillance information from both the robots and the analytics platform. In some embodiments, the authorized user(s) also set control commands which override the commands generated in the server or the local robots. In some embodiments, the authorized person also update certain features of the surveillance profile and robot tasks via the user interface.

The present invention also provides surveillance methods using the system described in the foregoing, including the steps of: predetermining a profile for a certain surveillance environment; configuring mobile robots dispatched in the surveillance environment; capturing data content for the surveillance environment by the mobile robots; sending data content to the cloud-based analytics platform; analyzing input data content on the cloud-based analytics platform; and generating commands and updates to the at least one mobile robot based on analysis.

In some embodiments, the methods further includes storing input data content and processed data in the cloud database. In some embodiments, the methods also includes reconfiguring robots based on the commands and updates. In some embodiments, the methods also includes prioritizing and encoding the input data content captured from the mobile robots into secure messaging. In some embodiments, the methods also includes exchanging information between neighboring or close robots. In some embodiments, the methods also includes monitoring and intervening the surveillance process by authorized user(s) via user interface.

A surveillance profile is predetermined for a specific surveillance environment, and the predetermined profile is stored in the cloud database and accessible to the cloud server. By way of an example but not limitation, the cloud-based surveillance system is used for providing security surveillance for an office building; in this case, the office building interior and/or surrounding exterior to predetermined geographic limits defines the target or predetermined surveillance environment. The profile includes at least one of: the authorized personnel identity information, the allowed or preset range of illumination, temperature, humidity, noise, air quality level, and an interior layout map of the building. The profile also includes sub-areas designated for different robots respectively, and patrol routes followed by each of the robots. The profile further includes the security levels for the building concluded by the robots, including normal, questionable, alert, and urgent and etc. The profile may further include corresponding response choices, including warning, alarming, time interval for review of change, immediate action, and the combinations thereof.

Each mobile robot has a certain surveillance sub-area to monitor and has its own tasks. Thus, each mobile robot is configured to carry out specific tasks for monitoring a specific surveillance sub-area. The specific tasks includes checking authorized ID information, inquiring unauthorized personnel, patrolling time and routes, capturing image and video data for designed sub-area, sensoring environmental indices, and/or reacting to abnormal situations accordingly input capture module profile operations, and combinations thereof.

Various function modules on the mobile robots are used for monitoring the surveillance area and correspondingly various media data content are collected by various function modules. For example, a mobile robot may check authorized ID information by RFID/NFC card reader, or intelligent facial recognition. For unauthorized individuals within the surveillance environment, the mobile robot preferably interacts with them through dialogue, and/or capturing the image/video for the interaction. As the mobile robot is patrolling along a certain route, statuses of the surveillance environment are captured by image and/or video cameras. Meanwhile, various sensors on the mobile robot will monitor the illumination, temperature, sound, noise and/or audio levels, humidity, air quality (e.g., if there is any poisonous leak), and combinations thereof. In addition to being sent to the cloud-based analytics platform, all the data from various function modules are preferably stored at the robot's local memory.

While the communication is required to be real-time or near real-time, not all the data collected from various function modules have to be sent to the server in order to reduce the communication volume and ensure communication quality. Preferably, when there is a state change, the change-in-state and/or change-in-setting data are sent to the cloud-based analytics platform. In some embodiments, there is a predetermined time interval for collecting data, and/or unless there is a state change during the predetermined time interval.

Before sending the captured raw data from different robots to the cloud-based analytics platform, the data are preferably filtered, sampled, prioritized and encoded into a secure message. In some embodiments, the captured data from various function modules may first be filtered to remove noise and other interference. In some embodiments, static data are sampled in order to reduce communication data volume. In some embodiments, the filtered and sampled data are prioritized before encoding. For example, data representing abnormal situations is encoded and sent prior to the data representing normal situations.

Preferably, the collected data are encoded into an IP-based security message. The encoded data are then sent to the cloud database via network communication. The at least one server can access to the database where the captured input data are stored. The at least one server first processes the input data. The process includes decoding, authenticating, indexing, aggregating, tagging, combining and grouping. Then the at least server analyzes the processed data. This process is completed in real-time or near real-time in a centralized or distributed manner.

Although "cloud computing" can generically be applied to any software as a service or to services interfacing through the Internet, in the present invention, "cloud-based" computing refers to distributed computing among at least one server or more than one server.

Based on the analysis, the at least one server may generate commands and updates to the mobile robots within the surveillance environment. The analyzed data, generated commands and updates associated with the input data content are also stored in the cloud database.

The whole process may be monitored by authorized person(s) via user interface. The authorized persons(s) can set commands to override the commands generated by the server, update and reconfigure the surveillance profile and/or surveillance tasks for the mobile robots.

In some implementations, the at least one mobile robots have some autonomous decision-making function to generate commands locally based on the predetermined tasks and the captured data by various function modules of the robot.

In some implementations, neighboring or close robots can talk to each other and exchange information besides the communication between the robots and the cloud-based analytic platform. For example, when a first robot has difficulty to access to part of its designated surveillance sub-area, the first robot can talk to a second robot who is close to the first robot, the second robot can take over the surveillance task in that sub-area. At the same time, either the first or the second robot reports to the server about the adaptation. This cross-communication between robots is complementary to the communication between robots and the cloud-based analytic platform. Accordingly, regional decision may be made based on the cross-communication between different robots.

Generally, local decisions made at one robot are the result when considering all the limitations within the robot's surveillance sub-area, regional decisions are the results of cross-communication between different robots, and overall commands made by the server are generated based on the information of the entire surveillance environment. Normally, there are no conflict between these commands. However, in one embodiment of the present invention, when there is a conflict between the local decision and the server command, a coordination algorithm is provided to resolve the conflict or difference, and the command priority is automatically determined thereby. Also, as mention earlier, an authorized user can make a decision to override the decisions made by the server or the robots, or update surveillance features. The at least one mobile robot(s) then execute the corresponding commands. In some embodiments, the profile of the entire surveillance environment is updated, and the surveillance tasks of the at least one robot are reconfigured.

Besides surveillance purpose, the stored historic data can be analyzed for some complementary purposes, such as marketing, product development, and remodeling analysis. As an example but not limitation, if this cloud-based surveillance data is a manufacturing facility, the collected temperature, illumination and humidity data can be analyzed for energy conservation.

Figure 1:
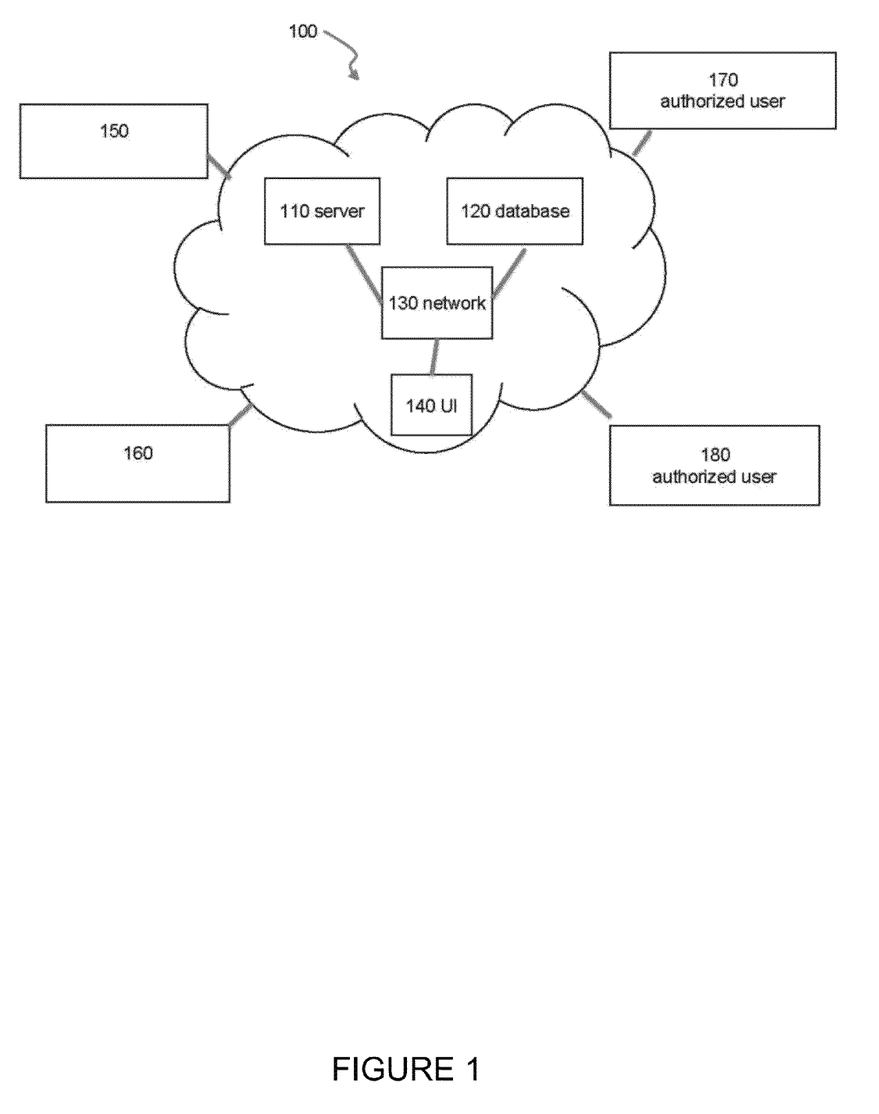
FIG. 1 is a system structure of the present invention.

FIG. 1 illustrates the system structure of the present invention. The cloud-based analytics platform is comprised of a cloud server 110, a cloud database 120, a communication network 130 and a user interface 140. The at least one mobile robot 150 and/or the at least one mobile device 160 communicate with the cloud-based analytics platform, and authorized users 170 and 180 can access to the cloud-based analytics platform via user interface 140.

Figure 2:
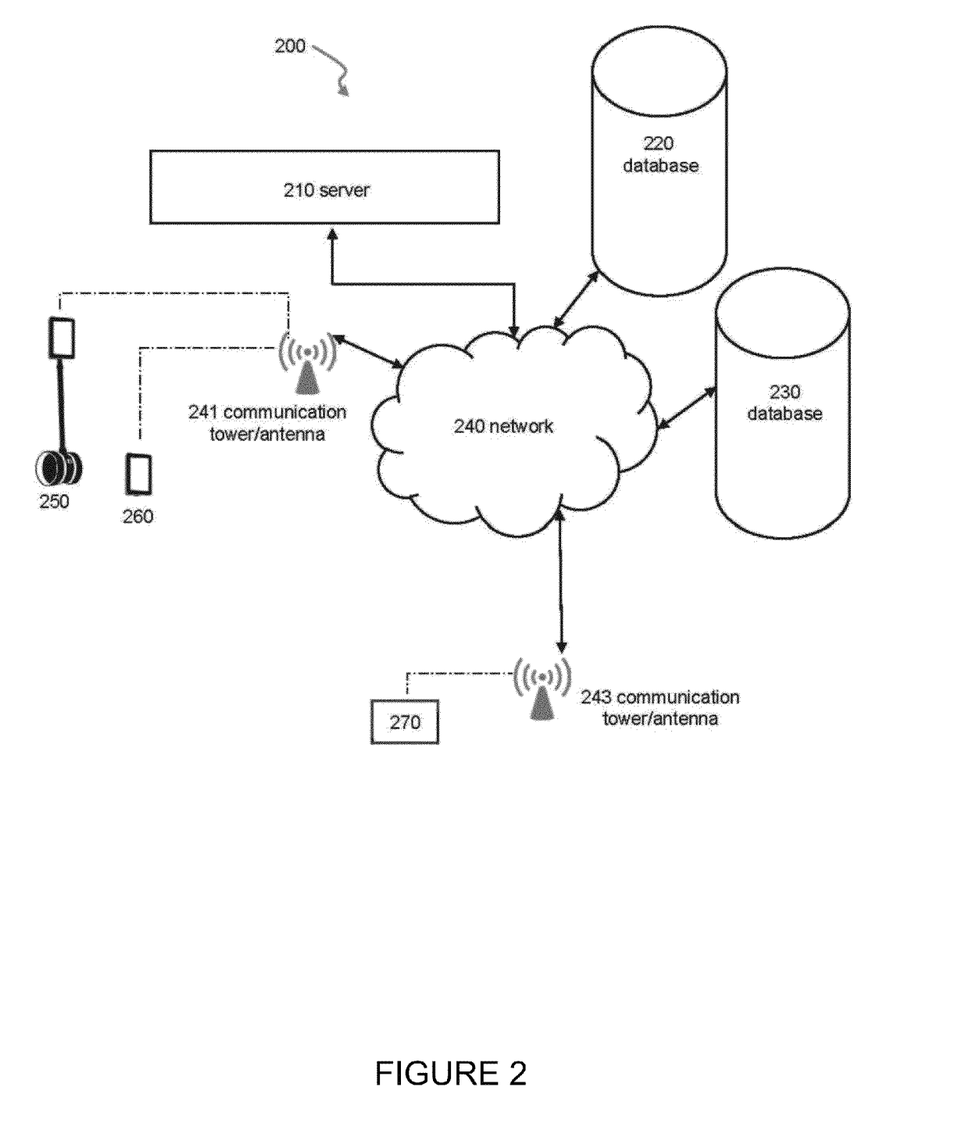
FIG. 2 is a schematic diagram of one embodiment of the invention.

FIG. 2 illustrates schematic diagrams of the present invention. FIG. 2 shows that a cloud-based analytic platform where at least one server 210, at least one database 220, and at least one geographical redundant database 230 communicate via a network 240. The at least one mobile robot 250 and/or the at least one mobile device 260 connect to the network via a communication tower/antenna 241. An authorized user may access to the cloud-based analytics platform via a user interface 270 installed on a laptop, personal computer, tablet, smart phone, or other device. Such user interface communicate with the network via a communication tower/antenna 243.

Figure 3:
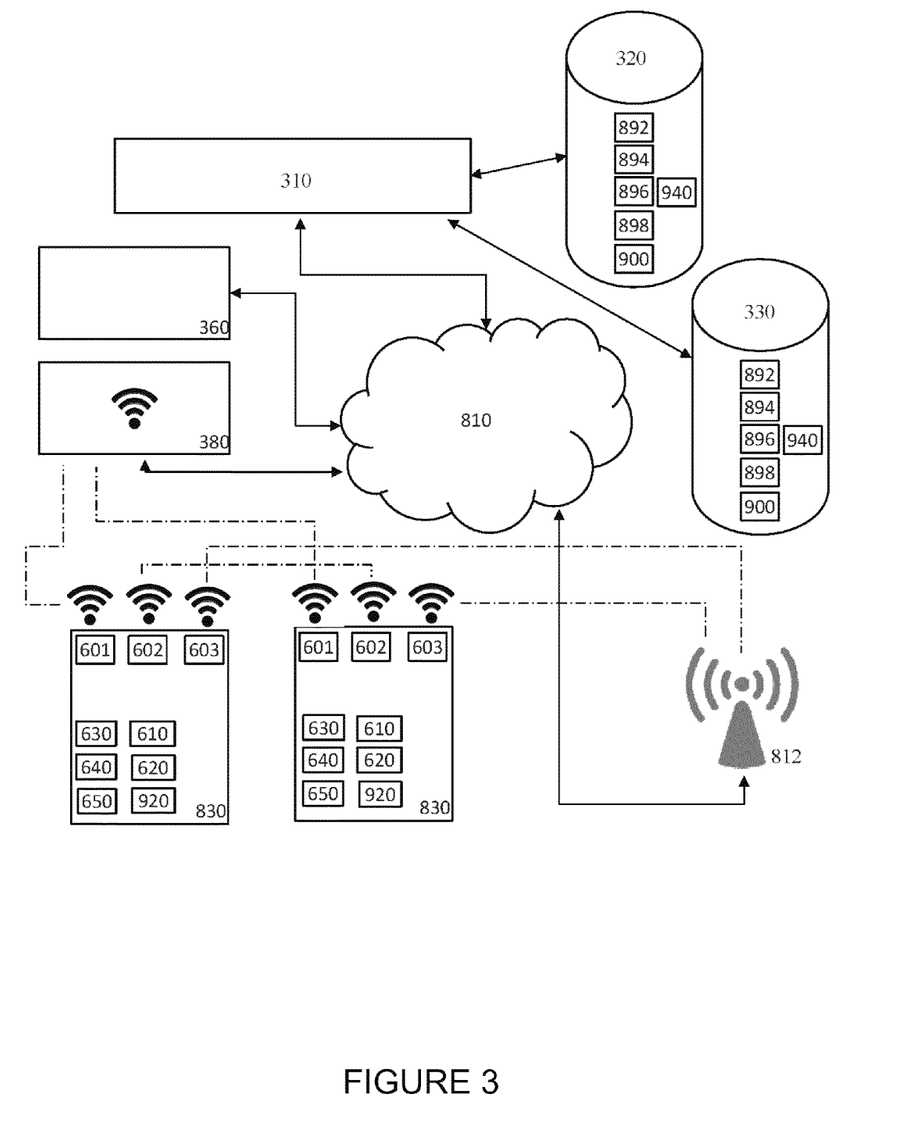
FIG. 3 is a schematic diagram of one embodiment of the invention.
Figure 4:
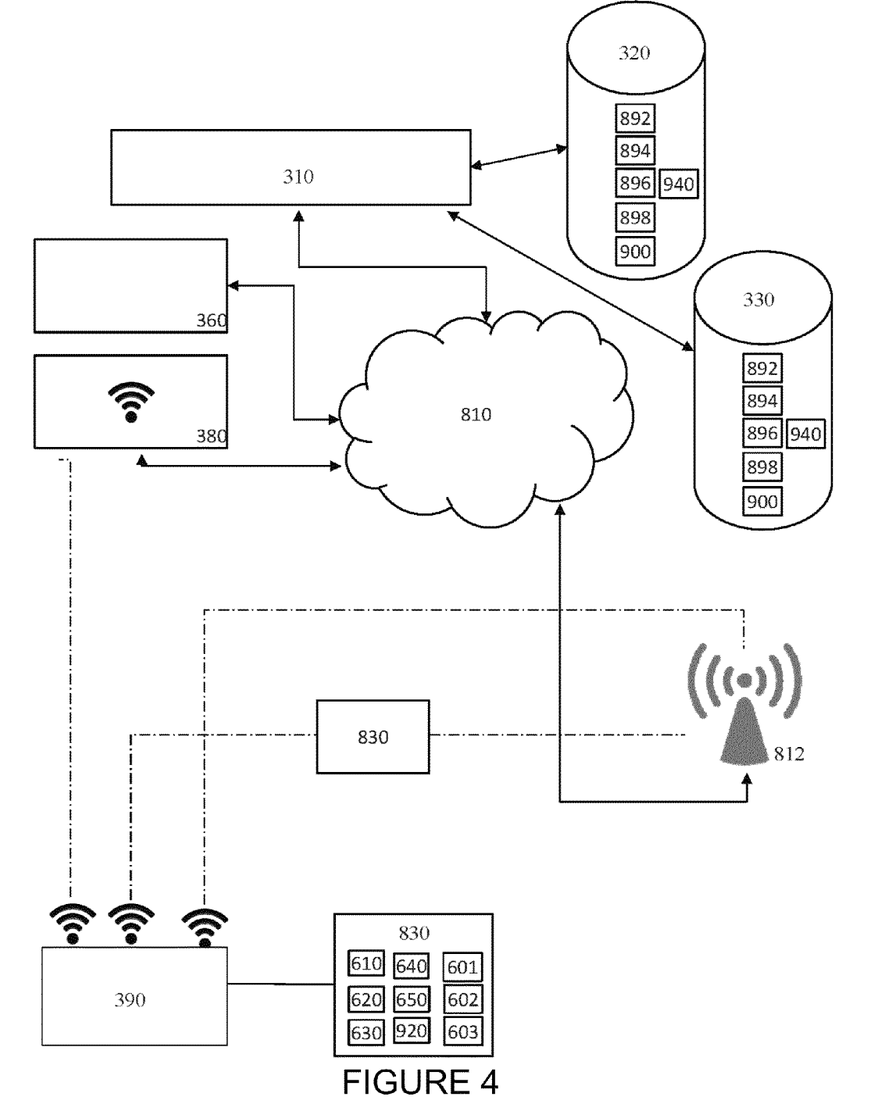
FIG. 4 is a schematic diagram of one embodiment of the invention.

FIGS. 3-4 illustrate schematic diagrams of the present invention; like reference indicators are used throughout the multiple figures for the same or similar elements, as appropriate. FIG. 1 shows a CPU processor and/or server computer 310 in network-based communication with at least one database 320 and at least one geographically redundant database 330, a communications (wired and/or wireless) router 380, communications tower 812 and distributed input capture devices 830. The distributed input capture devices may include image capture 610, video capture 620, audio capture 630, text and audio note 640, and/or geo-location 650 technologies, each technology capable of collecting data for upload to the network 810 and storage on the databases 320, 330. As the distributed input capture devices 830 may also contain identity technologies 920, such as facial, fingerprint and/or retina recognition, both databases 220, 240 may include identity database 940 for validating fingerprints, facial recognition, and/or retina recognition. Distributed input capture devices 830 may communicate with the each other through Bluetooth wireless 602, with the communications tower 812 through cellular wireless 603, and/or with a router 380 through Wi-Fi wireless 601. Device 360, being any computer, tablet, smartphone, or similar device, permits user access to the data, video, image, and audio storage on the cloud.

FIG. 4 illustrates another embodiment of a cloud-based analytics system providing for the components shown, including devices or interfaces 390 associated with input capture devices 830. The devices or interfaces may include wearable input capture devices, watch interfaces, device interfaces or software applications viewable on a display. For example, a software application on a smartphone having a graphic user interface (GUI) may provide for a live viewing area on the device and function buttons, virtual buttons (i.e., touch-activated, near-touch-activated, etc.) of record, notes, and send, associated with input capture devices 830.

Figure 5:
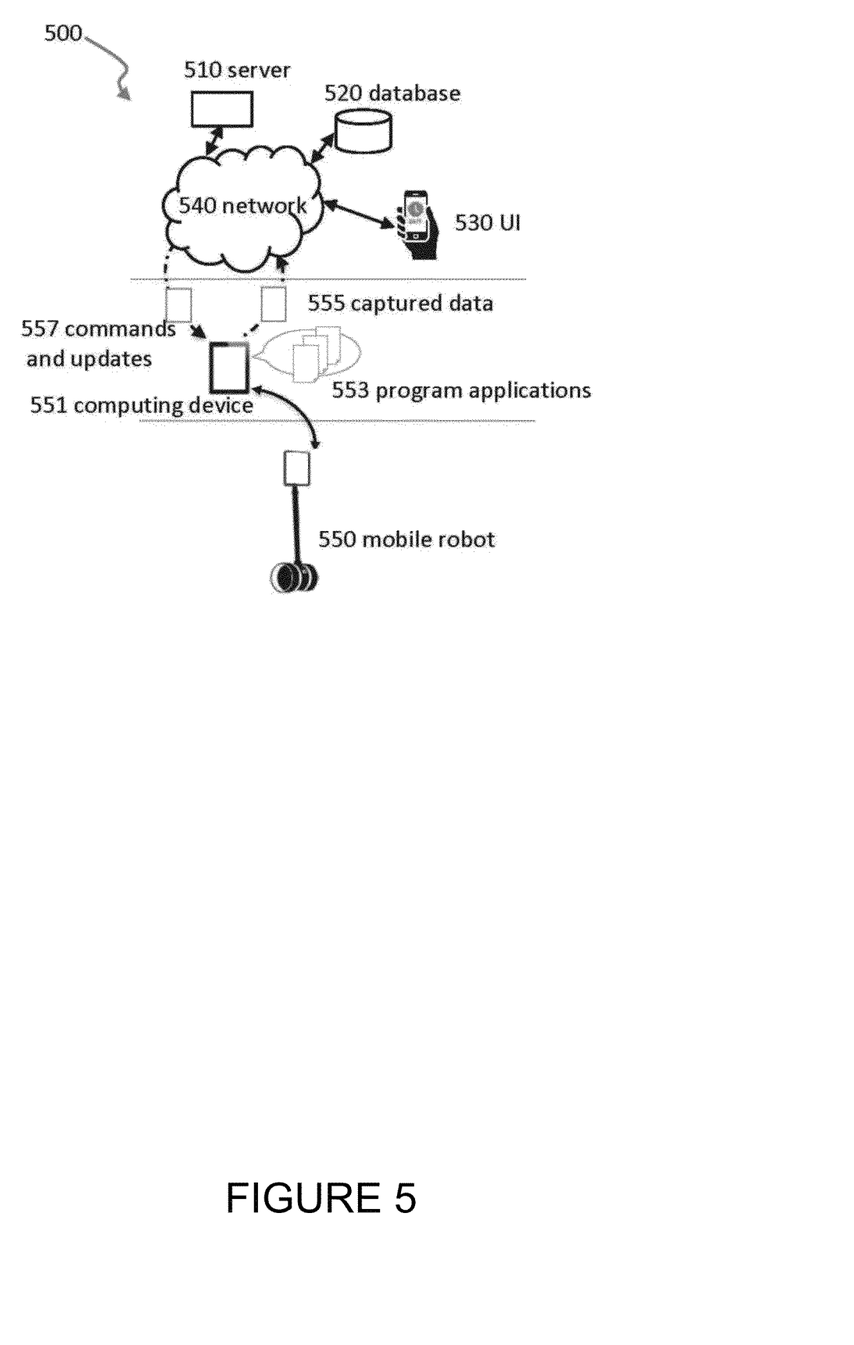
FIG. 5 is a schematic diagram of data exchange of the present invention.

FIG. 5 illustrates the data exchange of the present invention. A mobile robot (and/or mobile device) 550 couples with a computing device 551, which may be a tablet computer, portable electronic device, such as phone or personal digital assistant, or a dumb tablet or display (e.g., a tablet that acts as a monitor for an atom-scale PC in the robot body). At least one specific program application is installed on the computing device related to surveillance purpose. Such a computing device has communication capabilities so that the mobile robot may communicate with a cloud-based analytics platform. Such a platform comprises at least one server 510, at least one database 520, user interface 530 and communication network 540. The mobile robot (and/or mobile device) 550 has various data capturing modules, the captured data are sent to the platform via communication network 540. The at least one server processes and analyzes the data according to predetermined profile for a certain surveillance environment, and generates commands and updates and sends to the mobile robot via the communication network 540. All the captured data and analyzed data are stored in the at least one database 520. Authorized users may access to the platform via user interface 530.

Figure 6:
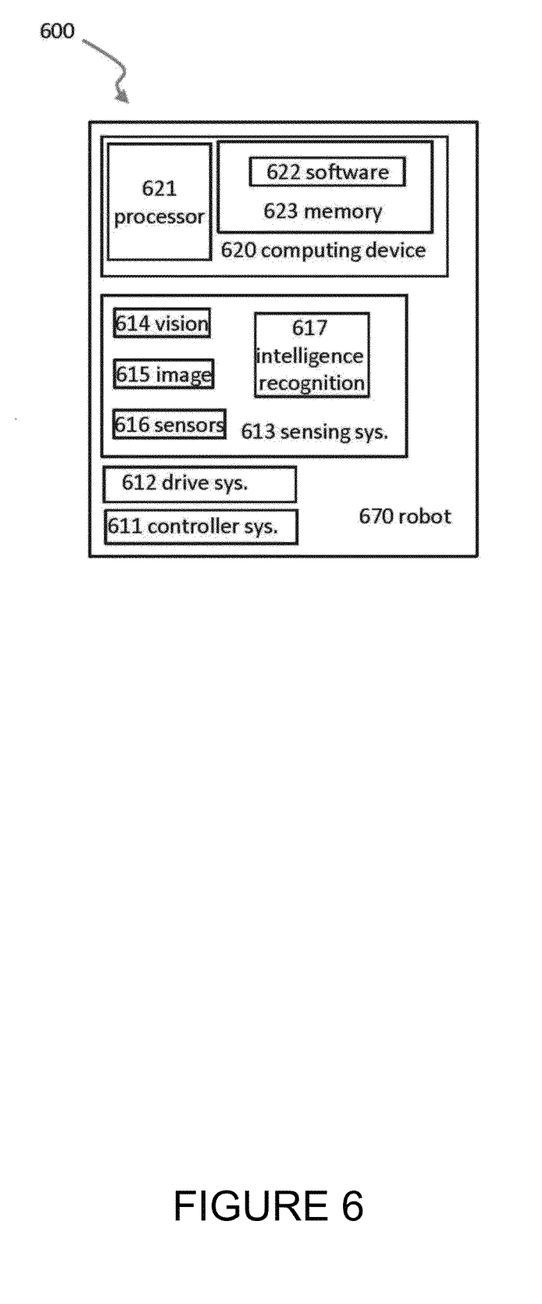
FIG. 6 is a schematic configuration of a mobile robot in the present invention.

FIG. 6 illustrates one embodiment of a mobile robot. A mobile robot 670 has its own controller system 611, drive system 620, and sensing system 630. Such sensing system may comprise a vision module 614, an image module 615, various sensor modules 616 and intelligence recognition module 617. The vision module 614 captures videos for a predetermined surveillance environment, and the image module 615 captures images for a predetermined surveillance environment. Various sensor modules 616 may monitor the sound level, temperature, humidity and air quality level and etc. Intelligence recognition module 617 may have facial recognition, speech recognition, person/object recognition, and other intelligence recognition functions. The mobile robot 670 is coupled with a computing device 620. The computing device at least comprises a processor 621 and a memory 623. At least one software application related to surveillance purpose is installed in the memory. The computing device may also have some complementary function modules in addition to the ones included in the sensing system of the robot.

Figure 7:
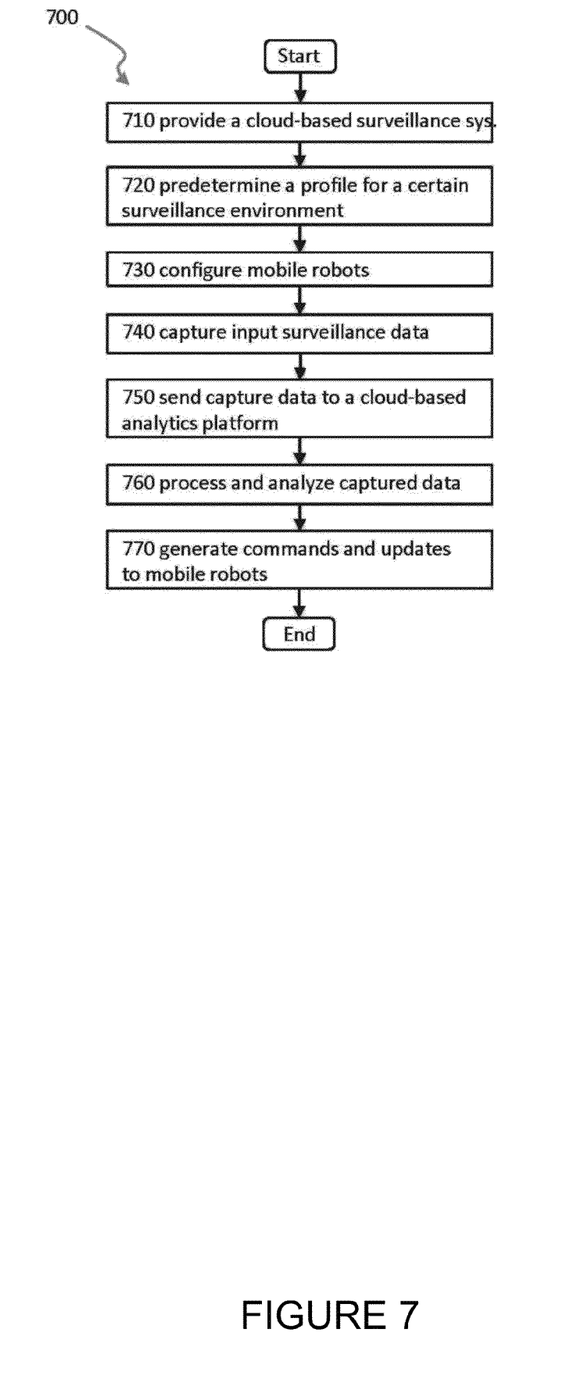
FIG. 7 is a flow chart of one embodiment of the invention.

FIG. 7 is a flow chart for the method in the present invention. A cloud-based surveillance system is provided 710. Then a profile for a certain surveillance environment is predetermined 720 and mobile robots (and/or mobile devices) are configured to carry out specific tasks according to the profile of the surveillance environment 730. The mobile robots capture surveillance data by various function modules 740 and send the captured data to a cloud-based analytics platform 750. At least one server in the cloud-based analytics platform processes and analyzes the captured data 760, and generates commands and updates to mobile robots (and/or mobile devices) 770.

Although 'cloud computing' can generically be applied to any software as a service or to services interfacing through the Internet, in the present invention, 'cloud-based' computing refers to distributed computing among at least one server or more than one server.

Figure 8:
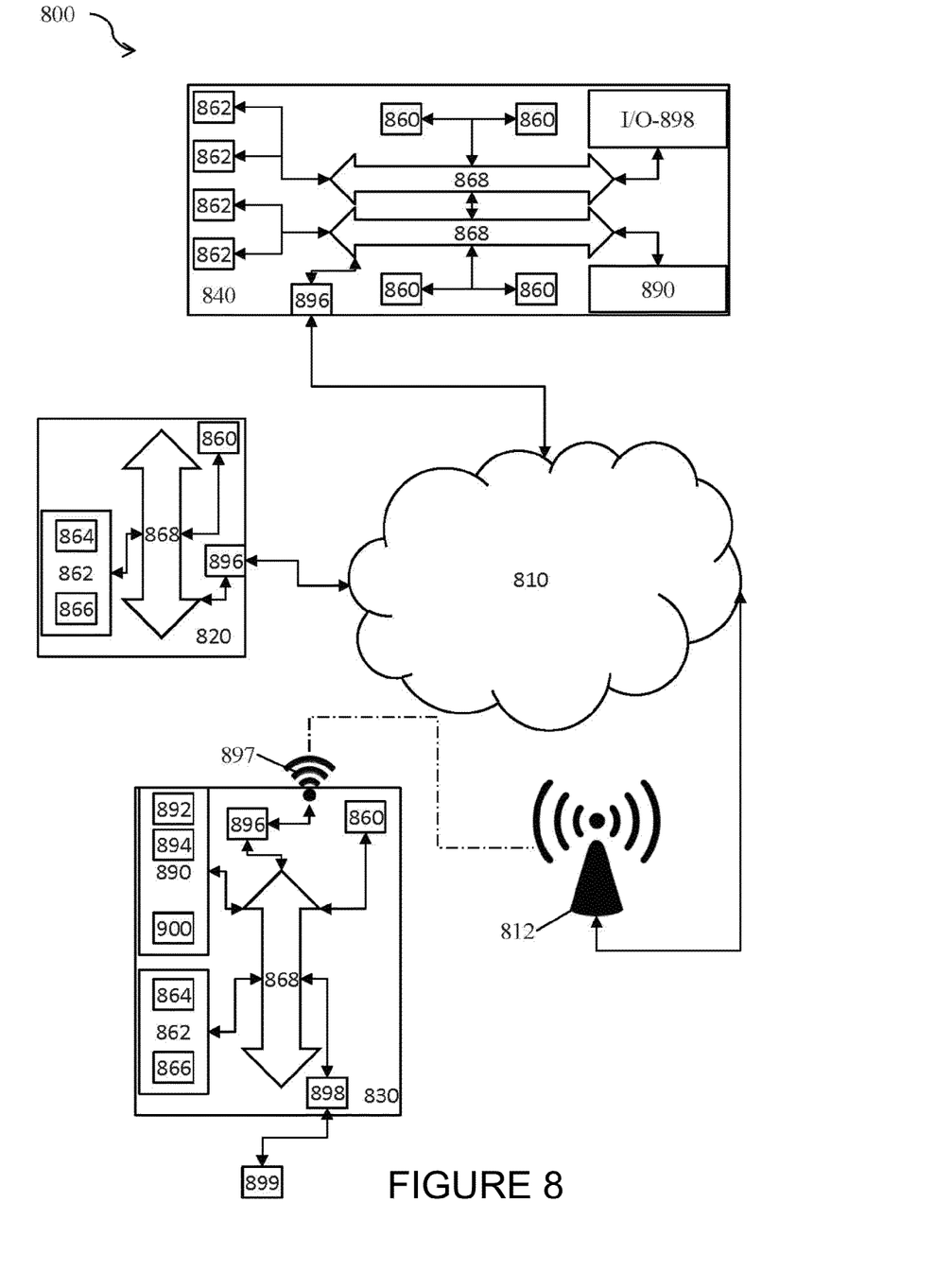
FIG. 8 is a schematic diagram of a cloud-based system of the present invention.

Referring now to FIG. 8, a schematic diagram illustrating a virtualized computing network used in of one embodiment of the invention for automated systems and methods is shown. As illustrated, components of the systems and methods include the following components and sub-components, all constructed and configured for network-based communication, and further including data processing and storage.

FIG. 8 is a schematic diagram of an embodiment of the invention illustrating a computer system, generally described as 800, having a network 810 and a plurality of computing devices 820, 830, 840. In one embodiment of the invention, the computer system 800 includes a cloud-based network 810 for distributed communication via the network's wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 8, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 8, may include other components that are not explicitly shown in FIG. 8, or may utilize an architecture completely different than that shown in FIG. 8. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The various illustrative logical blocks, modules, elements, circuits, and algorithms described in connection with the embodiments disclosed herein may be implemented as electronic hardware, computer software, or combination of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decision should not be interpreted as causing a departure from the scope of the present invention.

Certain modifications and improvements will occur to those skilled in the art upon a reading of the foregoing description. All the modifications and improvements have been deleted herein for the sake of conciseness and readability but are properly within the scope of the presented invention.

The invention claimed is:

1. A cloud-based surveillance system comprising:
   at least one mobile robot constructed and configured with input capture mechanisms coupled with a computing device;
   at least one customized program application installed on the computing device;
   the at least one mobile robot configured to carry out predetermined surveillance tasks;
   a cloud-based analytics platform comprising:
      a cloud server having software operable thereon providing a profile of a specific surveillance environment, wherein input data from the at least one mobile robot is processed and analyzed, and wherein commands and updates to the at least one mobile robots are generated;

a cloud database for storage, wherein the profile for the specific surveillance environment, input data, and associated processed and analyzed input data, and generated commands and/or updates are stored;

a network operable for communications between the at least one mobile robot and the cloud-based analytics platform;

a user interface provided on a remote communications computing device operable for communications over the network, providing access to information related to the entire surveillance system for authorized users.

2. The cloud-based surveillance system of claim 1, wherein the at least one mobile robot further includes a drive system, a sensing system, and a controller system.

3. The cloud-based surveillance system of claim 2, wherein the sensing system comprises a vison module, an imaging module, at least one sensor module, an intelligence recognition module and a control module.

4. The cloud-based surveillance system of claim 3, wherein the at least one sensor module is operable for detecting noise, temperature, humidity, air quality, light intensity, and/or motion.

5. The cloud-based surveillance system of claim 3, wherein the intelligence recognition module comprises facial recognition, identity card recognition, and/or speech recognition.

6. The cloud-based surveillance system of claim 1, wherein each of the at least one mobile robot has a unique identifier.

7. The cloud-based surveillance system of claim 1, wherein the computing device is a tablet computer or a portable electronic device.

8. The cloud-based surveillance system of claim 1, wherein the computing device has real-time and near real-time communication capabilities.

9. The cloud-based surveillance system of claim 1, wherein the computing device communicates with other computing devices.

10. The cloud-based surveillance system of claim 1, wherein the computing device has a different operating system from that of the robot controller.

11. The cloud-based surveillance system of claim 1, wherein the computing device processes data collected by the sensing system of the at least one robot.

12. The cloud-based surveillance system of claim 11, wherein the processing by the computing device includes filtering, sampling, prioritizing and encoding the input data into a secure message.

13. The cloud-based surveillance system of claim 1, wherein the at least one cloud server processes and analyzes input data from the at least one mobile robot.

14. The cloud-based surveillance system of claim 13, wherein at least one cloud server processes and analyzes input data in real time or near real time.

15. The cloud-based surveillance system of claim 14, wherein the secure message is transmitted over a network via internet protocol (IP) messaging of data packet(s) comprising the input data.

16. The cloud-based surveillance system of claim 14, wherein the processing by the at least one cloud server includes decoding, authenticating, indexing, aggregating, tagging, combining, grouping, editing the input data.

17. The cloud-based surveillance system of claim 14, wherein the at least one cloud server generates commands and updates to the at least one mobile robots based on the processing and analyzing.

18. The cloud-based surveillance system of claim 1, wherein the communication network may be wired networks, direct-wired connections or wireless networks.

19. The cloud-based surveillance system of claim 1, wherein the user interface may be a web browser and/or an application program.

20. The cloud-based surveillance system of claim 1, wherein the user interface may be accessed by a smart phone, a tablet, or a PC.

21. A method for cloud-based surveillance comprising:
providing a cloud-based surveillance system comprising at least one mobile robot and a cloud-based analytics platform, wherein the at least one mobile robot has a computing device attached, and wherein the cloud-based analytics platform comprises a cloud server, a cloud database, communication network and user interface;
predetermining a profile for a certain surveillance environment by the cloud server;
configuring at least one mobile robot dispatched in the surveillance environment;
capturing data of the surveillance environment by the at least one mobile robot;
sending captured data to the cloud-based analytics platform;
processing and analyzing input data on the cloud-based analytics platform; and
generating command and updates to the at least one mobile robots based on the analysis.

22. The method for cloud-based surveillance of claim 21, wherein the profile, captured data, analyzed data, and generated command and updates in the cloud database.

23. The method for cloud-based surveillance of claim 21, further comprising reconfiguring robots based on the commands and updates generated from analyzed data.

24. The method for cloud-based surveillance of claim 21, further comprising filtering, sampling, prioritizing and encoding input data content captured from the at least one mobile robot into secure messaging by the attached computing device.

25. The method for cloud-based surveillance of claim 21, further comprising exchanging information between neighboring or close mobile robots.

26. The method for cloud-based surveillance of claim 25, further comprising generating commands based on the information exchange between robots.

27. The method of cloud-based surveillance of claim 21, further comprising monitoring and intervening the surveillance system by authorized users via user interface.

28. The method for cloud-based surveillance of claim 21, wherein the processing may comprise decoding, authenticating, indexing, aggregating, tagging, combining, grouping, and editing the input data content.

29. The method for cloud-based surveillance of claim 21, further comprising processing input data and generating commands locally at the at least one mobile robot based on the configuration and the captured data.

30. The method for cloud-based surveillance of claim 21, further comprising coordinating the commands generated locally and the command from the server.

31. The method of cloud-based surveillance of claim 30, further comprising making overriding decisions through user interface.

32. The method of cloud-based surveillance of claim 21, wherein the processing and analyzing is in real time or near real time.

* * * * *